(12) United States Patent
Beev et al.

(10) Patent No.: US 11,465,552 B2
(45) Date of Patent: Oct. 11, 2022

(54) METHOD FOR OBTAINING AN IMAGE OF AN OBJECT TO BE CLASSIFIED AND ASSOCIATED SYSTEM

(71) Applicant: VALEO VISION, Bobigny (FR)

(72) Inventors: Kostadin Beev, Bobigny (FR); Marie Pellarin, Bobigny (FR); Gregory Planche, Bobigny (FR); Hui Jin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/311,564

(22) PCT Filed: Nov. 19, 2019

(86) PCT No.: PCT/EP2019/081844
§ 371 (c)(1),
(2) Date: Jun. 7, 2021

(87) PCT Pub. No.: WO2020/126264
PCT Pub. Date: Jun. 25, 2020

(65) Prior Publication Data
US 2022/0024372 A1    Jan. 27, 2022

(30) Foreign Application Priority Data
Dec. 18, 2018    (FR) ..................... 18 73181

(51) Int. Cl.
*B60Q 1/14*    (2006.01)
*G06V 20/58*    (2022.01)
(Continued)

(52) U.S. Cl.
CPC ............ *B60Q 1/143* (2013.01); *B60Q 1/085* (2013.01); *G06K 9/6267* (2013.01); *G06V 20/58* (2022.01); *B60Q 2300/45* (2013.01)

(58) Field of Classification Search
CPC ............ B60Q 2300/45; B60Q 2300/41; B60Q 2300/42; B60Q 2300/43; B60Q 2300/47;
(Continued)

(56) References Cited

U.S. PATENT DOCUMENTS 6,281,806 B1    8/2001    Smith et al.
9,789,808 B1    10/2017    Hong et al.
(Continued)

FOREIGN PATENT DOCUMENTS

EP    3 090 899 A1    11/2016

OTHER PUBLICATIONS

International Search Report dated Feb. 11, 2020 in PCT/EP2019/081844 filed on Nov. 19, 2019, 2 pages.

*Primary Examiner* — Robert J May
(74) *Attorney, Agent, or Firm* — Oblon, McClelland, Maier & Neustadt, L.L.P.

(57) ABSTRACT

A method for obtaining an image of an object to be classified for a driver assistance system of a motor vehicle, wherein the vehicle emits a plurality of selectively activatable light areas in front of it, at least partly forming an illuminating and/or signaling light beam. The method includes the following successive steps: —detecting an object to be classified by determining at least one parameter and defining a region comprising said object to be classified; —triggering an increase in the light intensity of said light areas illuminating said region; —taking at least one image of said object to be classified simultaneously with the triggering step; and—classifying the detected object on the basis of the at least one taken image. The invention also relates to a system for implementing said method and a vehicle comprising such a system. Lastly, the invention relates to a computer program product and a medium comprising such a program.

18 Claims, 1 Drawing Sheet

(51) Int. Cl.
 *B60Q 1/08* (2006.01)
 *G06K 9/62* (2022.01)
(58) Field of Classification Search
 CPC .... G06V 20/58; G06V 20/582; G06V 20/584; G06V 20/586; G06V 20/588
 See application file for complete search history.

(56) References Cited

U.S. PATENT DOCUMENTS

| | | |
|---|---|---|
| 10,331,956 B2 * | 6/2019 | Solar ..................... G06V 20/20 |
| 2016/0318437 A1 | 11/2016 | Vilakathara |
| 2017/0083774 A1 | 3/2017 | Solar et al. |
| 2018/0354408 A1 | 12/2018 | Sung |
| 2019/0311206 A1 | 10/2019 | Solar et al. |
| 2021/0046861 A1 * | 2/2021 | Li ......................... B60Q 1/143 |

\* cited by examiner

METHOD FOR OBTAINING AN IMAGE OF AN OBJECT TO BE CLASSIFIED AND ASSOCIATED SYSTEM

The invention relates to a method for obtaining an image of an object to be classified. The invention further relates to a system for obtaining an image of an object to be classified and to a vehicle comprising such a system. The invention also relates to a computer program product and to a data storage medium comprising such a program.

Vehicles equipped with a driving assistance system generally comprise a detection system such as a radar or a lidar and a camera oriented in front of the vehicle so as to detect the presence of obstacles in the path of the vehicle. The assistance system also comprises a classification system capable of classifying the objects that are in the environment of the vehicle by pairing the information obtained by the detection system with the images captured by the camera. The classification system makes it possible, for example, to discern objects such as pedestrians, vehicles, billboards, sidewalks, etc. This classification allows the vehicle to determine whether it can continue on its initial trajectory or whether it has to make a change of trajectory in order to avoid an object, a braking or deceleration maneuver.

However, such assistance systems are dependent on the quality of the image produced by the camera. Indeed, at night or in weather with low visibility, the quality of the images captured by the camera is lower, which results in a decrease in the performance of the classification system. The classification system is then not sufficiently reliable, which may result in inadequate action from the assistance system on the vehicle. This therefore presents a danger for users of the vehicle or for other road users.

The object of the invention is to provide a method for obtaining an image of an object to be classified and a system for obtaining an image of an object to be classified that allow the above drawbacks to be overcome. In particular, the invention makes it possible to form an image of an object to be classified that is of sufficient quality to classify this object.

According to a first aspect, the invention relates to a method for obtaining an image of an object to be classified for a system for assisting in driving a motor vehicle, wherein the vehicle emits, in front of it, a plurality of selectively activatable luminous zones at least partly forming a light beam for illuminating and/or signaling.

The method comprises the following successive steps:
detecting an object to be classified by determining at least one parameter and defining a region comprising said object to be classified;
triggering an increase in the luminous intensity of said luminous zones illuminating said region;
capturing at least one image of said object to be classified simultaneously with the triggering step; and
classifying the detected object on the basis of the at least one captured image.

The purpose of the classifying step is to activate or otherwise an action from an action module of the vehicle.

In one embodiment, the at least one parameter determined in the detecting step is taken from among
the position of the object to be classified; and/or
the perceived area of the object to be classified; and/or
the speed of the object to be classified; and/or
the distance between the vehicle and the object to be classified.

In one embodiment, the method further comprises, in the event of failure to classify the detected object on the basis of the captured image, the following successive steps:
triggering a second increase in the luminous intensity of said luminous zones, greater than said increase in the luminous intensity,
capturing at least one second image of said object to be classified simultaneously with the triggering of the second increase in the luminous intensity of said luminous zones,
classifying the detected object on the basis of the at least one second captured image.

In one embodiment, the increase in the luminous intensity of the luminous zones forming said region extends over a period shorter than 0.6 s, preferably shorter than 0.2 s.

In one embodiment, the step of classifying the object is performed on the basis of the at least one captured image or on the basis of the at least one second captured image and on the basis of at least one parameter determined by the step of detecting the object.

In one embodiment, the method comprises, subsequent to the classifying step, a step of said vehicle acting depending on the classification of the detected object.

In one embodiment, the step of the vehicle acting comprises a change in the trajectory of the vehicle and/or the vehicle braking and/or a step of warning the user and/or maintaining an initial trajectory and/or an initial speed.

According to a second aspect, the invention relates to a system for obtaining an image of an object to be classified for a vehicle comprising hardware and/or software elements implementing the method as claimed in one of the preceding claims, in particular hardware and/or software elements designed to implement the method as claimed in one of the preceding claims.

In one embodiment, the hardware elements comprise all or some of the following elements:
a detection device configured to emit electromagnetic waves and to acquire a reflection of the emitted electromagnetic waves;
a lighting device able to form a plurality of selectively activatable luminous zones forming at least partly a light beam for illuminating and/or signaling;
an image capture device such as a camera.

According to a third aspect, the invention relates to a motor vehicle, equipped with a driving assistance system, comprising a system for obtaining an image of an object to be classified according to the invention.

According to a fourth aspect, the invention pertains to a computer program product comprising program code instructions stored on a computer-readable medium for implementing the steps of the method according to the invention when said program is run on a computer or a computer program product that is downloadable from a communication network and/or stored on a data medium that is readable by a computer and/or executable by a computer, and comprising instructions which, when the program is executed by the computer, result in the latter implementing the method according to the invention.

According to a fifth aspect, the invention relates to a data storage medium, readable by a computer, on which is stored a computer program comprising program code instructions for implementing the method according to the invention or a computer-readable storage medium comprising instructions which, when they are executed by a computer, result in the latter implementing the method according to the invention.

The appended drawings show, by way of example, one embodiment of a system according to the invention and one embodiment of a method according to the invention.

Figure 1:
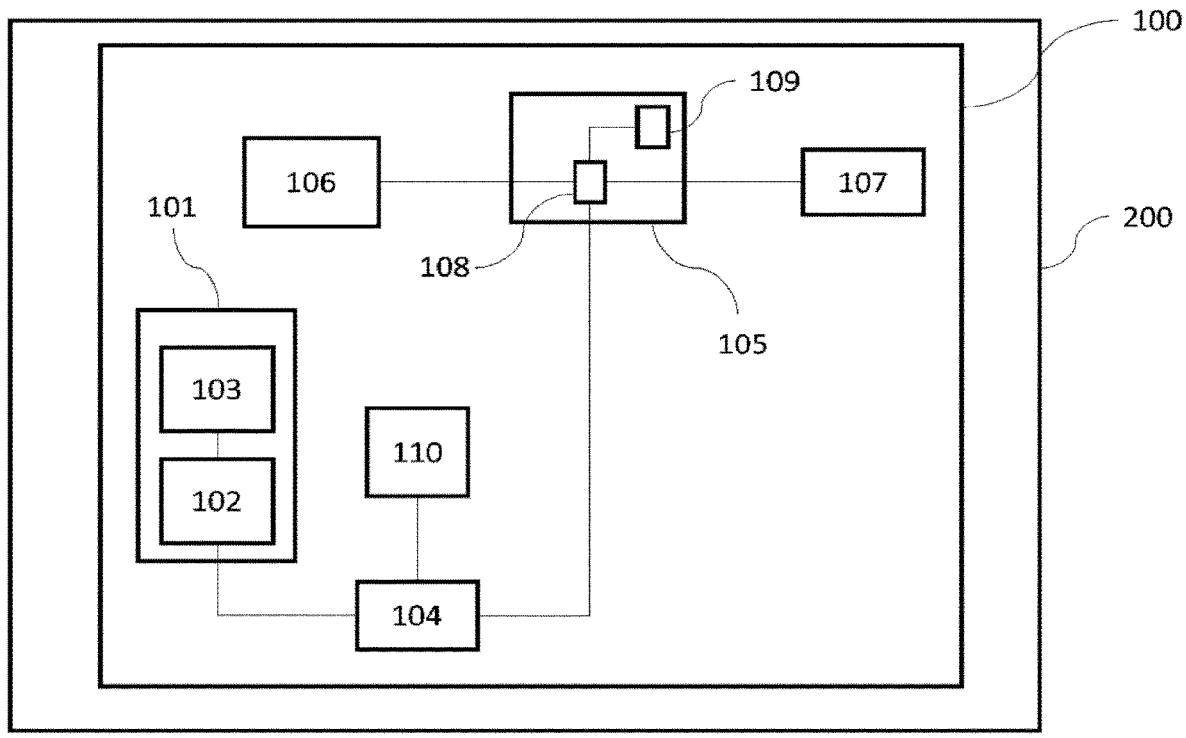
FIG. 1 shows a diagram of a vehicle comprising a system for obtaining an image of an object to be classified according to one embodiment.

One example of a motor vehicle 200 equipped with a system 100 for obtaining an image of an object to be classified according to one embodiment is described below with reference to [FIG. 1].

The vehicle 200 is equipped with a driving assistance system, in particular for reacting in an emergency.

What is meant by "classifying" is a method aiming to assign a class or a category to an object, in particular by identifying the object on the basis of an image, in order to make a decision depending on the category assigned to this object, in particular a decision likely to trigger an action from the vehicle such as a change in trajectory or a change in its speed.

The system 100 for a vehicle 200 for obtaining an image of an object to be classified comprises hardware and/or software elements 101, 102, 103, 104, 105, 106, 107 implementing or governing a method for obtaining of an image of an object to be classified. In particular, the system 100 for a vehicle 200 for obtaining an image of an object to be classified comprises the hardware and/or software elements that make it possible to implement the steps of the method according to one embodiment of the invention. These various elements may comprise software modules.

For example, the hardware and/or software elements may comprise all or some of the following elements:
a device 101 for detecting an object configured to emit electromagnetic waves and to acquire a reflection of the emitted electromagnetic waves;
a lighting device 110 able to form a plurality of selectively activatable luminous zones forming at least partly a light beam for illuminating and/or signaling;
an image capture device 106 such as a camera;

The detection device 101 comprises an electromagnetic wave emitter (not shown) and an electromagnetic wave receiver 103.

The detection device 101 may, for example, be a radar or a lidar.

The electromagnetic waves (radio for radar, optical for lidar) emitted by the emitter of the radar or of the lidar are reflected by the objects that they encounter. The reflected waves are captured and analyzed by the receiver 103. Preferably, the receiver 103 is placed at the same location as or close to the emitter. The distance between the object and the radar or lidar is obtained by measuring the time of flight of the wave signal.

What is meant by optical electromagnetic wave is an electromagnetic wave having a wavelength between 10 nm and 1 mm.

The detection device 101 makes it possible, by virtue of the analysis of the received waves, to detect the presence of an object by determining at least one parameter such as the position of the object. It may also determine, alternatively or additionally, the perceived area of the object to be classified, the speed of the object to be classified, the distance between the vehicle and the object to be classified.

The "perceived area" may be the area of a rectangle that allows the object to be classified to be framed.

The detection device 101 may comprise an electronic control unit 102 for processing the signal received by the receiver 103 of the detection device 101.

The control unit 102 is capable of defining a region in which the detected object is located.

In one embodiment, the electronic control unit 102 of the detection device 101 may comprise instructions for pre-classifying the object, in particular according to its perceived area and its speed.

The lighting device 110 may, for example, at least partly form a low beam, a high beam, a daytime running light (DRL), or an adaptive driving beam (ABD). The lighting device 101 is included in a headlamp of the vehicle 200.

Each luminous zone is activatable independently of the other luminous zones. The luminous intensity of each activatable luminous zone may thus be modulated independently of the luminous intensity of the other activatable luminous zones. Thus, the lighting device 110 allows the illumination of only an object to be classified and also makes it possible to illuminate distinct and disjunct regions.

In a first example, the lighting device 110 comprises one or a plurality of light sources distributed along one or more rows and/or down one or more columns, each associated with an optical system and together participating in the formation of the plurality of selectively activatable luminous zones at least partly forming the light beam for illuminating and/or signaling. By controlling the switching on or off of the light sources, it is possible to control the selective activation of the plurality of luminous zones.

In a second example, the lighting device 110 comprises a matrix array of reflecting micromirrors illuminated by a light source. Each micromirror is movable on at least one axis and may be oriented in two positions. A first position in which the light sent by the light source is reflected so as to participate in the formation of the light beam for illuminating and/or signaling and a second position in which the light sent by the light source is reflected so as not to participate in the formation of the light beam for illuminating and/or signaling. By pivoting the micromirrors on their axis, it is possible to control the selective activation of the plurality of luminous zones.

In a third example, the lighting device 110 comprises a laser source emitting a light beam, a micromirror off which the light beam emitted by the laser source is reflected, a light converter receiving the reflected light beam and an optical system imaging the surface of the light converter. By turning the laser source on or off, it is possible to control the selective activation of the plurality of luminous zones.

Advantageously, the system 100 comprises a control module 104 connected to the lighting device 110. The control module 104 makes it possible to control the selective activation of the plurality of luminous zones by controlling, for example, the luminous intensity of the luminous zones.

Preferably, each of the headlamps of the vehicle 200 comprises a lighting device 110 as described above.

By using two distinct lighting devices, it is possible to obtain more information on the object to be classified, in particular by alternately over-illuminating the object to be classified with a first lighting device and then with a second lighting device and/or by simultaneously over-illuminating the object to be classified with both lighting devices. The step of triggering an increase in the luminous intensity may then comprise illumination of the region comprising the object to be classified with a first lighting device and then with a second lighting device and/or with both lighting devices.

The use of two lighting devices in alternation may in particular make it possible to obtain a better image of the object to be classified, in particular in the event of reflection of the light emitted by one of the two lighting devices off the object to be classified. In addition, differentiated processing of the information produced using one or the other of the lighting devices by the camera may also make it possible to improve or enrich the classification by decreasing the effect of the shadows cast by the objects present in the images.

The image capture device 106 may be arranged to capture images of a road scene located in front of the vehicle 200 so as to see any obstacles in the path of the vehicle 200. The image capture device 106 is preferably arranged to capture images of a portion of the road illuminated by the light beam of the lighting device 110 as described above.

Preferably, the image capture device 106 comprises a front camera of the vehicle 200. The image capture device 106 may also comprise a 360° camera that allows images to be captured all around the vehicle 200.

The hardware and/or software elements of the system 100 may further comprise an electronic control module 105 comprising a computer 108 and a memory 109.

The electronic control module 105 is connected to the image capture device 106. The electronic control module 105 comprises code instructions and/or a neural network allowing the objects visible in the images provided by the image capture device 106 to be classified.

The computer 108 and/or the memory 109 may comprise a classifier capable of classifying an object on the basis of an image captured by the image capture device 106.

The classification includes at least classifying the object between two categories. A first category of objects that may present a danger for the vehicle, for example, another vehicle, a human, an animal, a cyclist. A second category comprises objects that cannot normally present a danger for the vehicle if the latter remains on its path, for example a tree, a trash can, a container, a lamppost, a traffic sign.

Optionally, the system 100 comprises an action module 107 connected to the electronic control module 105. The action module 107 may comprise an automatic braking device and/or a trajectory-changing device, and/or a device for warning the user of the vehicle.

The action module 107 may be activated and/or controlled by the electronic control module 105. If the action module 107 is not activated, the vehicle continues to follow its initial trajectory and/or its initial speed.

The various elements 101, 110, 104, 106, 105, 107 of the system may be connected to one another by information transmission means such as CAN (Controller Area Network) data buses.

The invention also relates to a vehicle 200 comprising such a system 100 for obtaining an image to be classified.

Figure 2:
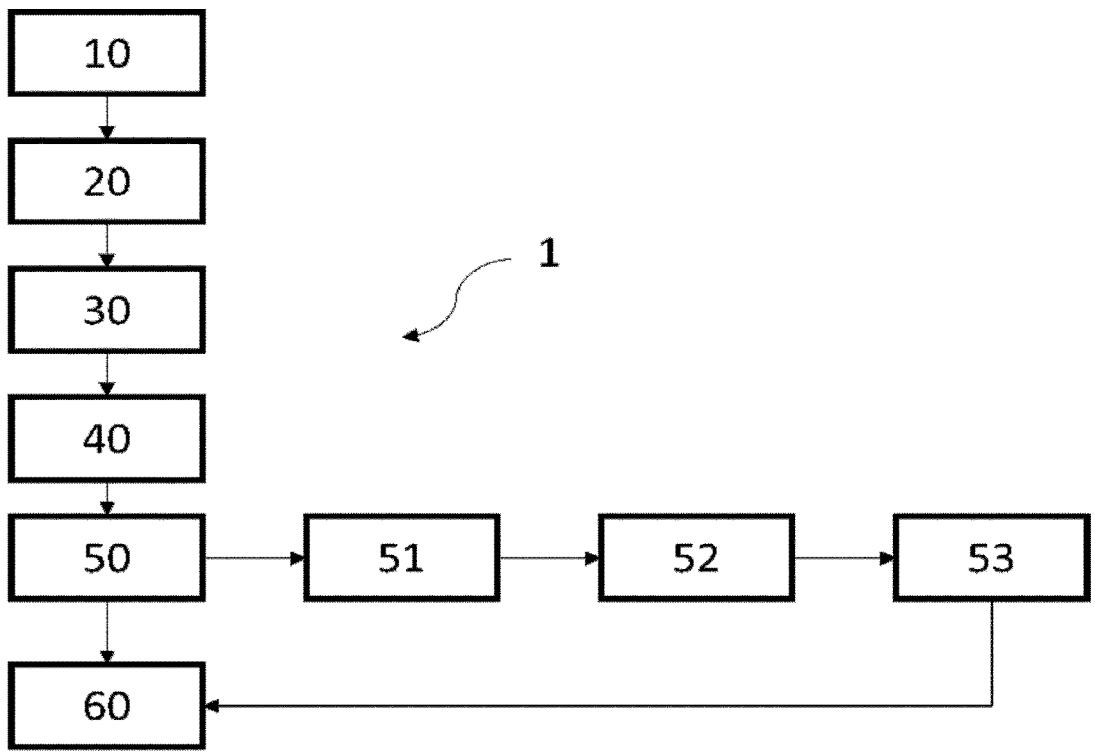
FIG. 2 shows a flowchart according to one embodiment of a method for obtaining an image of an object to be classified for a vehicle according to the invention.

One embodiment of the method 1 for obtaining an image of an object to be classified is described below with reference to [FIG. 2]. The method may also consist of a method for classifying an object close to a lane in which a vehicle is traveling or of a method for the autonomous reaction of a vehicle. This embodiment is described in the case of a period of low visibility or at night. In one embodiment, the method 1 implements the use of a system 100 for obtaining an image to be classified or of a vehicle 200 as described above. The information obtained on the object by the detection device 101 may be used for its classification.

In a first step 10, a vehicle 200, in particular the lighting device 110 of said vehicle 200, emits, in front of it, a light beam at least partly forming a light beam for illuminating and/or signaling. Said light beam comprises a plurality of selectively activatable luminous zones.

Optionally, the first step 10 is preceded by a step of capturing an image of an object to be classified and/or capturing an image comprising the scene of the road comprising the object to be classified and comprises a failure to classify said object in the captured image. The failure is preferably caused by insufficient luminosity of the object to be classified in the image, which does not allow a computer to recognize signatures of the object for its classification.

The method 1 comprises a second step 20 of detecting an object to be classified. The detecting step 20 is performed by the detection device 101. The detection of an object comprises at least determining a parameter relating to the detected object. The parameter may be the position of the object and/or the perceived area of the object and/or the speed of the object and/or the distance between the vehicle and the object. The second step further comprises defining a region comprising the object to be classified.

Said region may be of predefined shape (square, rectangular, ovoid) or may comprise contours so as to follow the contours of the detected object if the detection allows it. Said region may be defined by the detected position of the object relative to the position of the electromagnetic wave receiver 103. Said region may be defined angularly with respect to the receiver 103, according to the angular position of the signals received by the receiver.

Said region may comprise the entirety of the object to be classified. Said region may be defined so as to comprise the object and a region surrounding the area of the object over a predetermined distance such as at least 5 cm.

In a third step 30, the method comprises triggering an increase in the luminous intensity of the luminous zones illuminating the region defined in the second step 20 in which the object is detected.

The triggering of an increase in the luminous intensity is achieved by the lighting device 110 of said vehicle 200 emitting, in front of it, a plurality of selectively activatable luminous zones at least partly forming the light beam for illuminating and/or signaling in the first step 10.

What is meant by "increase" is that the luminous intensity of the luminous zones transitions from a first (zero or non-zero) value to a second value higher than the first value. The "increase" includes activation of a previously off luminous zone when an object is detected at a position located outside the light beam then emitted by the light module. For example, when the light beam is part of a low-beam light beam, the detected object may be located outside the zone illuminated by the light beam. It is then possible to activate certain luminous zones participating in the high-beam light beam.

In this way, said object is over-illuminated with respect to the rest of the light beam. This selective increase in luminous intensity advantageously allows better visibility of the object to the image capture device 106.

In one embodiment, the increase in the luminous intensity of the luminous zones in the region comprising the detected object to be classified may be performed in a non-homogeneous manner. For example, it may be done so as to project a luminous pattern onto the object to be classified. In another example, the light received by the object may be a gradient.

The projection of non-homogeneous light onto the region comprising the object advantageously makes it possible to provide information on the relief of the object to be classified.

As mentioned above, the increase in luminous intensity may be achieved by a first light module located in a first headlamp and by a second light module located in a second headlamp.

The increase in the luminous intensity of the luminous zones comprising the region in which the object is detected may extend over a period shorter than 0.6 s, preferably shorter than about 0.2 s so as not to dazzle the object if the object is a person, for example, a pedestrian or a cyclist.

In a fourth step 40, at least one image of said object or of said region is captured simultaneously with the third step 30.

The captured image thus comprises an image of the object or of the region comprising the object during its over-illumination.

In a fifth step 50, the captured image of the region or of the object is delivered to a classifier. The classifier classifies or attempts to classify the object using an image in which the object is more visible.

Preferably, the classifier receives the information on the object to be classified determined in the second step by the detection device.

Depending on the classification of the object, in particular if the object is classified as a potential obstacle, the method may comprise a sixth step 60 comprising an action from the vehicle in response to this classification.

What is meant by a potential obstacle is any moving or stationary object that should cause a change in the vehicle driving instructions such as a change in trajectory or a change in speed. A potential obstacle may comprise any object (other vehicle, cyclist, pedestrian, animal or other) that may present a risk of collision with the vehicle 200.

If the object to be classified is classified as a potential obstacle, the method may comprise the activation of an action from an action module 107 of said vehicle 200.

The action from the vehicle may comprise braking. The action from the vehicle may comprise a change in the trajectory of the vehicle or even comprise a warning to the user of a risk of collision. The warning may be a visual, sound or touch warning (for example, vibrating of the seat or of the steering wheel).

If the object to be classified is classified as not being a potential obstacle, the method may comprise the activation of an instruction to maintain the initial trajectory of the vehicle 200.

In the event of failure of the classifying step 50, in particular if the image of the object is still not sufficiently illuminated, the method may comprise additional steps comprising triggering 51 a second increase in the luminous intensity of the luminous zones comprising the region in which the object is detected. Said second increase in luminous intensity is greater than the first increase in luminous intensity in the third step 30.

In particular, the first increase in luminous intensity may be such that it is not dazzling for a person, and the second increase in luminous intensity may be dazzling for a person. Thus, an attempt is made initially to improve the detection of an object without dazzling a person who might constitute the object or who might be located close to the object.

The second increase may be greater in terms of duration of emission (duration of the second light increase longer than the duration of the first light increase). The second increase may comprise increasing the number of over-intensified luminous regions so as to over-intensify illumination over a wider region around the object to be classified.

In one embodiment, the triggering of a second increase comprises an increase in the intensity of the light sources that is greater than that of the first increase in the third step 30.

The triggering of the second increase may come from a different lighting device than that used in the third step 30. The lighting device used in the third step 30 may be included in a first headlamp of the vehicle 200 and the lighting device used for triggering the second increase may be included in the second headlamp of the vehicle 200.

The method then comprises a second capture 52 of an image of the object simultaneously with the step 51 of triggering a second increase in the luminous intensity greater than the first increase in the luminous intensity of the luminous zones.

The image captured in the second image capture may then be used for a new attempt 53 to classify the object similar to the fifth step described above.

If classification is successful, the sixth step 60 described above is then performed.

In one embodiment, the memory 109 is a non-transient memory.

In one embodiment, the memory 109 comprises a data storage medium, readable by a computer, on which is stored a computer program comprising program code instructions for implementing the method according to the invention. The memory 109 may comprise a computer-readable storage medium comprising instructions which, when they are executed by a computer, result in the latter implementing the method according to the invention.

The invention claimed is:

1. A method for obtaining an image of an object to be classified for a system for assisting in driving a motor vehicle, wherein the vehicle emits, in front of it, a plurality of selectively activatable luminous zones at least partly forming a light beam for illuminating and/or signaling and the method comprises the following successive steps:
   detecting an object to be classified by emitting electromagnetic waves toward the object, receiving reflected electromagnetic waves reflected from the object and analyzing the reflected electromagnetic waves to determine at least one parameter and define a region comprising said object to be classified;
   triggering an increase in the luminous intensity of said luminous zones illuminating said region;
   capturing at least one image of said object to be classified simultaneously with the triggering step; and
   classifying the detected object on the basis of the at least one captured image.

2. The method as claimed in claim 1, wherein the at least one parameter determined in the detecting step is taken from among:
   the position of the object to be classified; and/or
   the perceived area of the object to be classified; and/or
   the speed of the object to be classified; and/or
   the distance between the vehicle and the object to be classified.

3. The method as claimed in claim 2, wherein the increase in the luminous intensity of the luminous zones forming said region extends over a period shorter than 0.6 s.

4. The method as claimed in claim 2, further comprising, subsequent to the classifying step, a step of said vehicle acting depending on the classification of the detected object.

5. The method as claimed in claim 1, wherein the increase in the luminous intensity of the luminous zones forming said region extends over a period shorter than 0.6 s.

6. The method as claimed in claim 1, further comprising, in the event of failure to classify the detected object on the basis of the captured image, the following successive steps:
    triggering a second increase in the luminous intensity of said luminous zones, greater than said increase in the luminous intensity,
    capturing at least one second image of said object to be classified simultaneously with the triggering of the second increase in the luminous intensity of said luminous zones,
    classifying the detected object on the basis of the at least one second captured image.

7. The method as claimed in claim 6, further comprising, subsequent to the classifying step, a step of said vehicle acting depending on the classification of the detected object.

8. The method as claimed in claim 5, further comprising, subsequent to the classifying step, a step of said vehicle acting depending on the classification of the detected object.

9. The method as claimed in claim 5, wherein the increase in the luminous intensity of the luminous zones forming said region extends over a period shorter than 0.2 s.

10. The method as claimed in claim 1, further comprising, subsequent to the classifying step, a step of said vehicle acting depending on the classification of the detected object.

11. The method as claimed in claim 10, wherein the step of the vehicle acting comprises
    a change in the trajectory of the vehicle; and/or
    the vehicle braking; and/or
    a step of warning the user; and/or
    maintaining an initial trajectory and/or an initial speed.

12. A system for obtaining an image of an object to be classified for a vehicle comprising hardware and/or software elements implementing the method as claimed in claim 1.

13. The system as claimed in claim 12, wherein the hardware elements comprise all or some of the following elements:
    a detection device configured to emit electromagnetic waves and to acquire a reflection of the emitted electromagnetic waves;
    a lighting device able to form a plurality of selectively activatable luminous zones forming at least partly a light beam for illuminating and/or signaling;
    an image capture device such as a camera.

14. A motor vehicle equipped with a driving assistance system comprising a system for obtaining an image of an object to be classified as claimed in claim 12.

15. A computer program product comprising program code instructions stored on a computer-readable medium for implementing the steps of the method as claimed in claim 1 when said program is run on a computer or a computer program product that is downloadable from a communication network and/or stored on a data medium that is readable by a computer and/or executable by a computer.

16. A data storage medium, readable by a computer, on which is stored a computer program comprising program code instructions for implementing the method as claimed in claim 1.

17. The method as claimed in claim 1, wherein said emitting electromagnetic waves and receiving reflected electromagnetic waves comprises using lidar or radar to detect the object to be classified.

18. A method for obtaining an image of an object to be classified for a system for assisting in driving a motor vehicle, wherein the vehicle emits, in front of it, a plurality of selectively activatable luminous zones at least partly forming a light beam for illuminating and/or signaling and the method comprises the following successive steps:
    detecting an object to be classified by determining at least one parameter and defining a region comprising said object to be classified, wherein the at least one parameter determined in the detecting step is taken from among:
    the position of the object to be classified; and/or
    the perceived area of the object to be classified; and/or
    the speed of the object to be classified; and/or
    the distance between the vehicle and the object to be classified;
    triggering an increase in the luminous intensity of said luminous zones illuminating said region;
    capturing at least one image of said object to be classified simultaneously with the triggering step; and
    classifying the detected object on the basis of the at least one captured image; and in the event of failure to classify the detected object on the basis of the captured image, the following successive steps are performed:
    triggering a second increase in the luminous intensity of said luminous zones, greater than said increase in the luminous intensity,
    capturing at least one second image of said object to be classified simultaneously with the triggering of the second increase in the luminous intensity of said luminous zones,
    classifying the detected object on the basis of the at least one second captured image.

\* \* \* \* \*